(No Model.)
C. N. BIDDLE.
WHEEL.
No. 269,255. Patented Dec. 19, 1882.
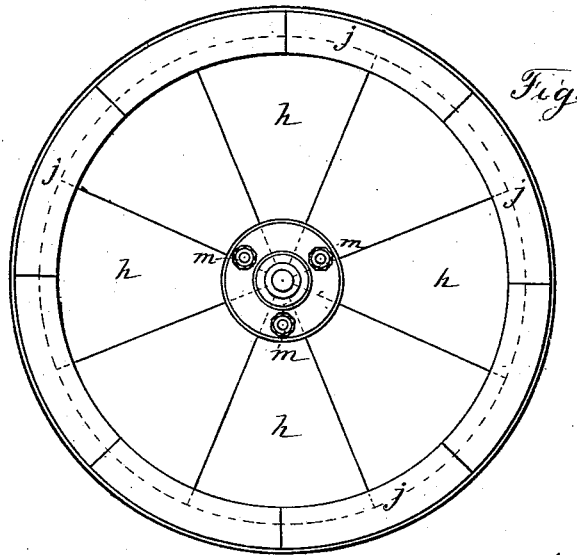
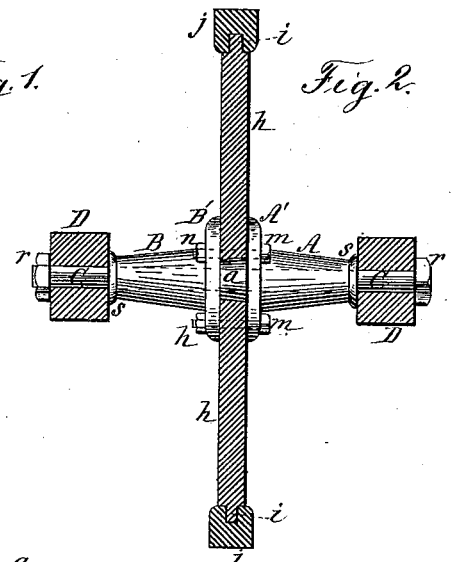
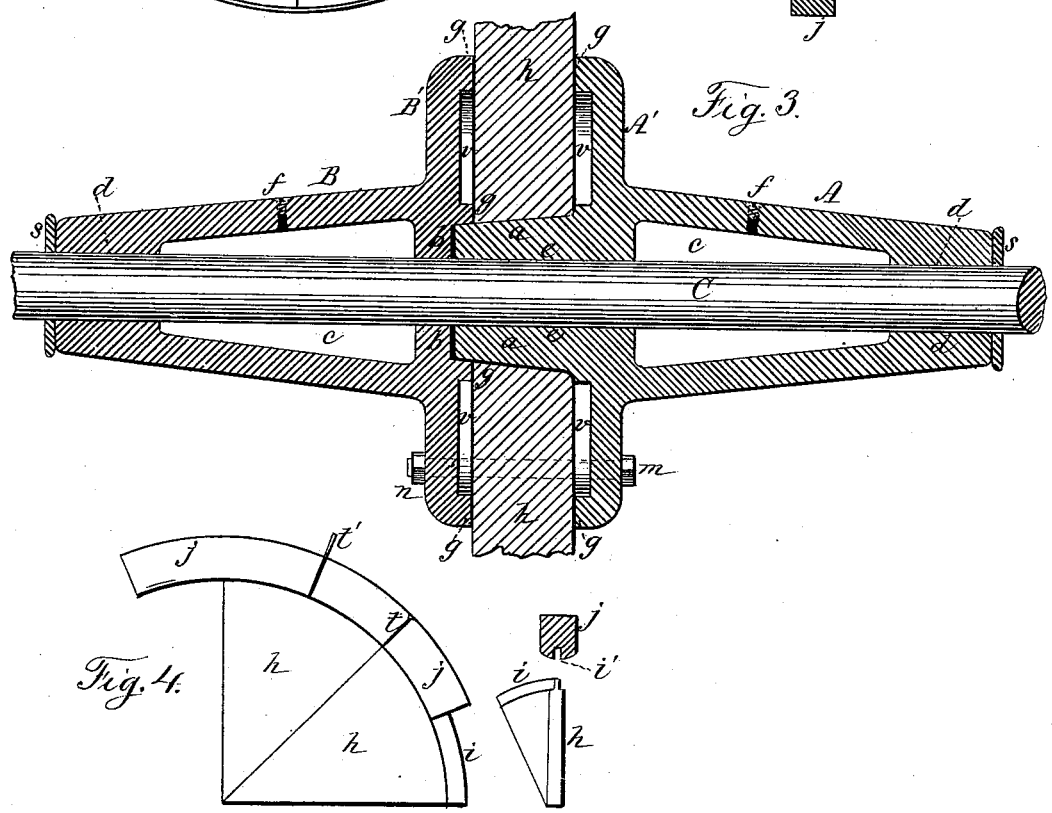
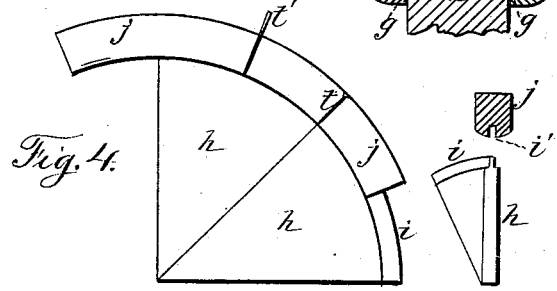
Witnesses:
Edmund Brodhag
J. C. Wildman
Inventor:
pro Charles N. Biddle
Johnson & Johnson
Atty

UNITED STATES PATENT OFFICE.

CHARLES N. BIDDLE, OF RICHWOOD, OHIO.

WHEEL.

SPECIFICATION forming part of Letters Patent No. 269,255, dated December 19, 1882.

Application filed September 6, 1882. (No model.)

*To all whom it may concern:*

Be it known that I, CHARLES N. BIDDLE, a citizen of the United States, residing at Richwood, Union county, State of Ohio, have invented new and useful Improvements in Hubs and Wheels, of which the following is a specification.

I have produced by my improvements a wheel suitable for hand-barrows, trucks, &c., in which grooved fellies are supported upon tongued board sections, forming a solid wheel-body bound upon a flanged hub of two interlocking cast-iron sections, having middle and end bearings upon a center rod and provided with oil-chambers for lubricating said bearings, rendering the wheel firm, strong, and of great durability.

The particular matters which distinguish my wheel from others will be made the subject of specific claim, and are illustrated in the accompanying drawings, in which—

Figure 1 represents an elevation of my wheel; Fig. 2, a sectional elevation; Fig. 3, a longitudinal section of the hub on an enlarged scale; and Fig. 4, detail views, showing the grooved fellies and the tongued board sections, which form the body of wheel.

The hub is of cast-iron, of two sections, A and B, each having a vertical flange, A' B', at their joining ends, each cored out centrally to receive an iron or steel bearing-rod, C, and interlocked centrally at their flanged ends, with middle and end bearings, lubricated by chambers containing oil. The section A has a central tubular projection, $a$, which forms a support for the body-sections of the wheel and the bearing of the hub upon the center rod, while the section B has a recess, $b$, to receive the end of the tubular projection $a$, to interlock the hub-sections and form a bearing for one section upon the other. The lubricating-chambers $c\ c$ are formed in the hub parts proper between the end bearings, $d\ d$, and the middle bearing, $e$, and they are supplied with oil by holes $f$ in the hubs, which are closed by screws. The inner faces of the flanges are recessed, so as to form ring-bearings $g$ around the outer edges of the flanges and at the joining of the tubular projection, for a purpose to be presently described.

The body of the wheel is preferably formed of eight sections, $h$, of suitable wood or other suitable material about three-quarters of an inch thick, joining in radial lines, their inner ends supported upon the hub middle bearing-projection, $a$, and their outer ends turned with a tongue, $i$, upon which fellies $j$, having corresponding grooves, $i'$, are secured. The tongue is about a half-inch projection, and, when the sections are joined, forms a continuous circular tenon around a solid body. The fellies and the body-sections break joints and the grooved fellies, when driven upon the circular tenon, may be secured by wrought nails $t$ driven through them radially at the joining of the body-sections, as shown in Fig. 4. The fellies may be tightened by wedges $t'$ driven between their ends, and the tire is shrunk on and secured in the usual way.

In the manufacture of the wheel the body-sections and the fellies are secured together as described, and a hole is cut at the center of the joined body-sections to receive the tubular hub-bearing. The hub-sections are then joined and clamped together upon the body-sections by screw-bolts $m$ and nuts $n$, binding the flange bearing-rings $g$ hard upon the opposite sides of the body-sections, the recesses $v$ in the flanges admitting of a slight elasticity in the connection of the body of the wheel with the hub. The wheel is secured to the frame by the center bearing-rod, C, and nuts $r$ screwed upon its ends outside of the frame D, washers $s$ being placed upon the rod between the ends of the hub-sections and the frame, as shown in Fig. 2. The screws $m$ pass through corresponding holes in the hub-flanges and in the body-sections, and, in connection with the interlocking of the hub-sections, secure them firmly together and upon the wheel-body, and thus maintain the hub-sections in exact axial relation to each other and uniform bearing upon the bearing-rod, the same as if the hub was of a single casting.

I claim—

1. The combination of the wooden sections $h$, joined radially to form a solid wheel-body, having a continuous circumferential tenon, $i$, with fellies $j$, grooved to correspond with said tenon, the hub-sections A B, interlocked at the center by the tubular projection $a$, forming a support for the body-sections, and the screw-bolts m, substantially as described, for the purpose specified.

2. A wheel having radially-joined wooden body-sections h, formed with a continuous circumferential tenon, i, in combination with fellies having corresponding grooves, i', secured upon said tenon in break-joints with the body-sections, the hub-sections having flanges formed with bearing-rings g, and interlocking at the center by the tubular projection a of one section and a central receiving-recess, b, in the other section, and the screw-bolts m, the said tubular projection forming a support for the wheel-body sections and a middle bearing for the hub-sections upon the bearing-rod, as herein set forth.

3. In combination, the grooved fellies j, the tenoned body-sections h, the flanged hub-sections A B, interlocking at the center, the bolts m, and bearing-rod C, and the nuts r, all constructed and united in a wheel having a solid body of radially-joined sections and a hub having middle and end bearings, e d d, and oil-chambers c c, substantially as set forth.

In testimony whereof I have hereunto set my hand in the presence of two subscribing witnesses.

CHAS. N. BIDDLE.

Witnesses:
L. C. BEEM,
S. S. GARDINER.